US010471700B2

(12) United States Patent
Hakkaku

(10) Patent No.: US 10,471,700 B2
(45) Date of Patent: Nov. 12, 2019

(54) THREE-DIMENSIONAL OBJECT MANUFACTURING APPARATUS AND CONTROL METHOD FOR THE SAME

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 299 days.

(21) Appl. No.: 15/376,675

(22) Filed: Dec. 13, 2016

(65) Prior Publication Data

US 2017/0165922 A1 Jun. 15, 2017

(30) Foreign Application Priority Data

Dec. 14, 2015 (JP) .................................. 2015-243607

(51) Int. Cl.
*B29C 67/00* (2017.01)
*B33Y 10/00* (2015.01)
*B33Y 30/00* (2015.01)
*B33Y 50/02* (2015.01)
*B29C 64/379* (2017.01)
*B29C 64/112* (2017.01)
*B29C 64/40* (2017.01)

(52) U.S. Cl.
CPC ............ *B33Y 50/02* (2014.12); *B29C 64/379* (2017.08); *B33Y 30/00* (2014.12); *B29C 64/112* (2017.08); *B29C 64/40* (2017.08)

(58) Field of Classification Search
CPC ....... B29C 64/379; B29C 64/40; B29C 64/03; B29C 64/112; B33Y 50/02; B33Y 30/00
See application file for complete search history.

(56) References Cited

U.S. PATENT DOCUMENTS

2003/0207213 A1* 11/2003 Farnworth ............ G03F 7/0037
430/315
2012/0195994 A1* 8/2012 El-Siblani .............. B33Y 10/00
425/174.4

FOREIGN PATENT DOCUMENTS

ES 2414661 B1 * 6/2014 ......... B23D 57/0046
JP 2002178412 6/2002
(Continued)

OTHER PUBLICATIONS

"Office Action of Japan Counterpart Application", dated Feb. 19, 2019, with English translation thereof, p. 1-p. 5.

*Primary Examiner* — Joseph S Del Sole
*Assistant Examiner* — Mohamed K Ahmed Ali
(74) *Attorney, Agent, or Firm* — JCIPRNET

(57) ABSTRACT

A three-dimensional object manufacturing apparatus that may be equipped to efficiently separate a three-dimensional object from a mounting unit is provided. The printing apparatus includes: a mounting unit having a mounting surface on which a three-dimensional object being manufactured is mounted; a separator to separate the three-dimensional object from the mounting unit; a moving unit to move the three-dimensional object remaining on the mounting surface and the separator unit relative to each other after the manufacturing of the three-dimensional object is completed, the three-dimensional object on the mounting surface and the separator being moved to arrive at a separating position at which the three-dimensional object is separated by the separator; and a controller that controls the moving unit.

13 Claims, 3 Drawing Sheets

(56) References Cited

FOREIGN PATENT DOCUMENTS

| | | |
|---|---|---|
| JP | 2007-527334 | 9/2007 |
| JP | 2010036583 | 2/2010 |
| JP | 2014513637 | 6/2014 |

* cited by examiner

THREE-DIMENSIONAL OBJECT MANUFACTURING APPARATUS AND CONTROL METHOD FOR THE SAME

CROSS REFERENCE TO RELATED APPLICATIONS

This application claims the priority benefit of Japanese Patent Application No. 2015-243607, filed on Dec. 14, 2015. The entirety of the above-mentioned patent application is hereby incorporated by reference herein and made a part of this specification.

BACKGROUND

Technical Field

This disclosure relates to a three-dimensional object manufacturing apparatus and a control method for the three-dimensional object manufacturing apparatus.

Patent Literature 1 describes a modeling apparatus including a platform and a base. The base is detachable from the platform. After the manufacturing of a model is completed, the base is detached from the platform, and the model is removed from the base.

[Patent Literature 1]: Japanese Translation of PCT Publication No. 2007-527334 (published on Sep. 27, 2007)

SUMMARY

The technology described in Japanese Translation of PCT Publication No. 2007-527334 (published on Sep. 27, 2007), however, requires an operator to detach the base from the modeling apparatus and carry the base to a work area where the model is removed from the base. Instead of such an apparatus requiring manual labor associated with transport of the base, apparatuses are desirably obtained that can more efficiently manufacture three-dimensional objects.

To address this issue, this disclosure is directed to providing a three-dimensional object manufacturing apparatus that may be equipped to efficiently separate a three-dimensional object from a mounting unit.

To this end, the inventors of this application conducted various studies and finally arrived at the technical solutions described below.

A three-dimensional object manufacturing apparatus disclosed herein includes: a mounting unit having a mounting surface on which a three-dimensional object being manufactured is mounted; a separator configured to separate the three-dimensional object from the mounting unit; a moving unit configured to move the three-dimensional object remaining on the mounting surface and the separator relative to each other after the manufacturing of the three-dimensional object is completed, the three-dimensional object on the mounting surface and the separator being moved to arrive at a separating position at which the three-dimensional object is separated by the separator; and a controller that controls the moving unit.

A control method disclosed herein controls a three-dimensional object manufacturing apparatus including: a three-dimensional object; a mounting unit having a mounting surface on which the three-dimensional object being manufactured is mounted; a separator configured to separate the three-dimensional object from the mounting unit; and a moving unit configured to move the three-dimensional object on the mounting surface and the separator relative to each other. The moving unit is controlled so as to move the three-dimensional object remaining on the mounting surface and the separator to a separating position at which the three-dimensional object is separated by the separator after the manufacturing of the three-dimensional object is completed.

According to the three-dimensional object manufacturing apparatus and the control method therefor, the three-dimensional object still attached to the mounting unit may be automatically detached from the mounting unit at the separating position. Thus, the three-dimensional object may be efficiently separated from the mounting unit.

The three-dimensional object manufacturing apparatus according to an aspect of this disclosure may be further characterized in that the separator has a cutting portion that partly cuts the three-dimensional object to separate the three-dimensional object from the mounting surface, the cutting portion cuts the three-dimensional object in a manner that a cut surface of the three-dimensional object is substantially parallel to the mounting surface, and the controller controls the moving unit so as to move the three-dimensional object and the cutting portion relative to each other and have the cutting portion cut the three-dimensional object.

Examples of the cutting portion may include a claw-like separator, a wire, and a blade. By having the cutting portion cut the three-dimensional object in a manner that its cut surface is substantially parallel to the mounting surface, the cutting portion may be prevented from colliding against the mounting surface or from thrusting into the three-dimensional object. This may avoid possible damage to the mounting unit and/or the three-dimensional object. Cutting by the hand may involve the risk of damaging the three-dimensional object because fine control of a cutting force is difficult. On the other hand, mechanical control of the cutting force using the apparatus may be easier, preventing the risk of damaging the three-dimensional object.

The three-dimensional object manufacturing apparatus according to another aspect of this disclosure may be further characterized in that materials of the cutting portion include at least one selected from a stainless steel, a plastic, a steel, and a diamond.

The cutting portion including one selected from such materials may adequately separate the three-dimensional object from the mounting unit.

The three-dimensional object manufacturing apparatus according to yet another aspect of this disclosure may be further characterized in that a manufacturing position at which the three-dimensional object is manufactured and the separating position are different positions, and the controller controls the moving unit so as to move the three-dimensional object from the manufacturing position to the separating position after the manufacturing of the three-dimensional object is completed.

By thus moving the three-dimensional object from the manufacturing position to a different work area for object separation after the manufacturing of the three-dimensional object is completed, a next three-dimensional object may start to be manufactured at the manufacturing position. This may allow three-dimensional objects to be manufactured more efficiently (improved manufacturing efficiency or turnover rate).

The three-dimensional object manufacturing apparatus according to yet another aspect of this disclosure may be further characterized in that the mounting unit is an endless belt.

The three-dimensional object manufacturing apparatus thus having the mounting unit and the moving unit integrally formed may facilitate the relative movements of the three-dimensional object and the separator toward the separating position after the three-dimensional object is manufactured. As a result, the three-dimensional object may be manufactured and separated from the mounting unit more efficiently.

The three-dimensional object manufacturing apparatus according to yet another aspect of this disclosure may further include a collecting unit that collects the three-dimensional object separated from the mounting unit, and a collection guiding unit. The collecting guiding unit may be disposed at a position between the separating position and the collecting unit. The collecting unit may be disposed at a position on a vertically lower side than the separating position relative to the mounting surface.

By having the collection guiding unit disposed between the collecting unit and the separating position and having the collecting unit disposed on the vertically lower side than the separating position relative to the mounting surface, the separated three-dimensional object may be collected without causing damage to the three-dimensional object.

The three-dimensional object manufacturing apparatus according to yet another aspect of this disclosure may be further characterized in that the mounting unit is structured to have a plurality of the three-dimensional objects mounted on the mounting surface, the manufacturing position and the separating position are different positions, and the controller controls the moving unit so as to locate the mounting surface on which one of the three-dimensional objects is mounted at the manufacturing position by the time when the separation of another one of the three-dimensional objects is completed after arriving at the separating position.

The three-dimensional object manufacturing apparatus is then allowed to start the manufacturing of one of the three-dimensional objects by the time when the separation of another one of the three-dimensional objects by the separator is completed after arriving at the separating position. This may conduced to an improved productivity.

The three-dimensional object manufacturing apparatus according to yet another aspect of this disclosure may be further characterized in that a part of the three-dimensional object cut by the cutting portion is a separation layer interposed between a body of the three-dimensional object to be separated and the mounting surface.

Thus having the separation layer interposed between the mounting unit and the body of the three-dimensional object may facilitate the separation of the three-dimensional object from the mounting unit. Further favorably, possible damage to the body may be prevented at the time of separating the three-dimensional object from the mounting unit.

This disclosure may deliver the effect of efficiently separating the three-dimensional object from the mounting unit.

DETAILED DESCRIPTION OF EMBODIMENTS

Three-Dimensional Object Manufacturing Apparatus

First Embodiment

Figure 1:
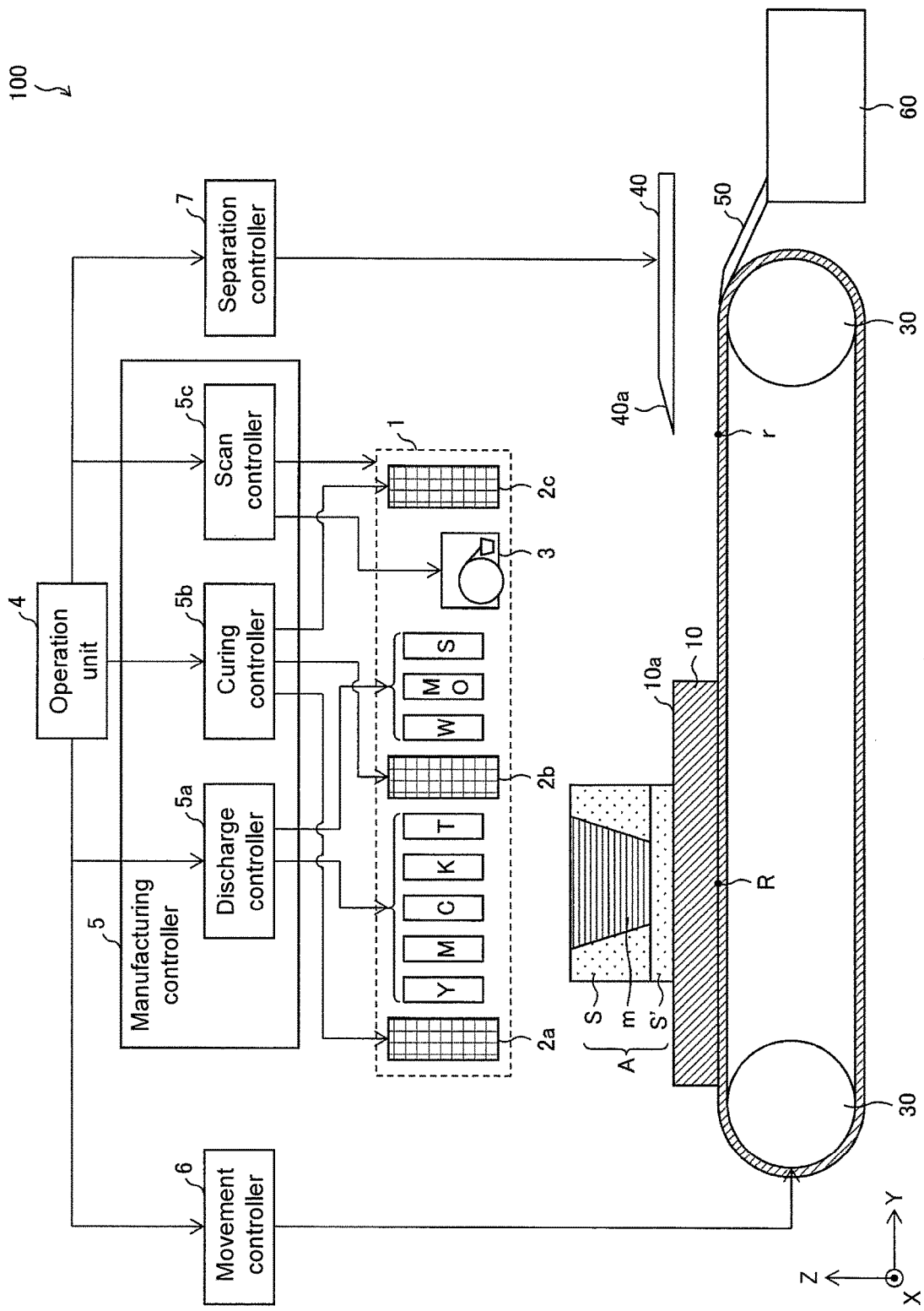
FIG. 1 is a schematic drawing of the structure of a printing apparatus 100 illustrated as an embodiment of the three-dimensional object manufacturing apparatus disclosed herein, and steps of manufacturing and separating a three-dimensional object A.

A first embodiment of the three-dimensional object manufacturing apparatus disclosed herein is hereinafter described referring to FIG. 1. FIG. 1 is a schematic drawing of the structure of a printing apparatus 100 illustrated as an embodiment of the three-dimensional object manufacturing apparatus disclosed herein, and steps of manufacturing and separating a three-dimensional object A.

In this embodiment, the three-dimensional object A is manufactured by the printing apparatus 100, as illustrated in FIG. 1. The printing apparatus 100 has a carriage 1, an operation unit 4, a manufacturing controller 5 (controller), a movement controller 6 (controller), a separation controller 7 (controller), a mounting unit 10, a collection guiding unit 50, and a collecting unit 60.

[Carriage 1]

The carriage 1 is loaded with heads Y, M, C, K, T, W, MO, and S, UV-LED lamps 2a, 2b, and 2c, and a flattening roller 3.

The carriage 1 is movable in a main scanning direction (including Y direction and −Y direction), a sub scanning direction (X direction), and a vertical direction (including Z direction and −Z direction) relative to a mounting surface 10a. In the case the manufacturing apparatus for three-dimensional objects disclosed herein includes a carriage, the apparatus may have the carriage fixed at a position in at least one of the main scanning direction, sub scanning direction, and vertical direction relative to the mounting surface 10a, while having the mounting unit move in the direction in which the carriage is fixed. Instead, the carriage and the mounting unit may be both configured to move.

[Heads Y, M, C, K, T, W, MO, and S]

The head Y, head M, head C, head K, head T, head W, head MO and head S are all ink jet heads. These heads respectively discharge yellow (Y), magenta (M), cyan (C), black (K), clear (T), and white (W) color inks, an ink for modeling material (MO), and an ink for support material (S). The heads Y, M, C, K, T, W, MO, and S perform scans over the mounting unit 10 while reciprocating in the main scanning direction. These heads discharge the respective inks during the scans to form a body m, a separation layer s' and a support material s, finally obtaining the three-dimensional object A.

The ink jet heads may be selected from the known ink jet heads. Examples of the known ink jet heads may include ink jet heads that discharge ink droplets by leveraging vibrations of a piezoelectric device (ink jet heads that discharge ink dots through mechanical deformation of an electrostrictive device), and ink jet heads that leverage thermal energies.

The three-dimensional object manufacturing apparatus disclosed herein may preferably employ the inkjet printing, as described in this embodiment. The inkjet printing may allow the apparatus to more efficiently manufacture the three-dimensional objects, possibly reducing total time that takes to manufacture the three-dimensional object and separate the manufactured three-dimensional object from the mounting unit. The inkjet printing, however, may be a non-limiting example of this disclosure.

[UV-LED Lamps 2a, 2b, and 2c]

The UV-LED lamps 2a, 2b, and 2c are devices that irradiate ultraviolet curing-type inks discharged from the heads Y, M, C, K, T, W, MO, and S with ultraviolet light.

This embodiment describes ultraviolet curing-type inks as exemplified inks used to form the body m, separation layer s', and support material s.

In the case the ultraviolet curing-type inks are used in the three-dimensional object manufacturing apparatus disclosed herein, the ultraviolet radiating devices are not limited to the LEDs but may be selected from the various known devices capable of radiating ultraviolet light.

[Flattening Roller 3]

The flattening roller 3 moves, while rotating, on the inks discharged from the heads Y, M, C, K, T, W, MO, and S to flatten the inks. By having the flattening roller 3 rotate and flatten the inks, the uppermost surface of ink layers may be flattened. The flattening roller 3 may be selected from any known devices that can flatten the upper surfaces of the inks. The flattening roller 3 is equipped with a blade and a receiving pan. The blade removes the inks attached to the flattening roller 3 at the time of flattening the ink layers. The receiving pan receives and stores the inks removed by the blade.

[Operation Unit 4]

The operation unit 4, based on data externally inputted thereto, outputs control command signals to the manufacturing controller 5, movement controller 6, and separation controller 7. The operation unit 4 may include a keyboard, a touch panel, and/or a mouse.

[Manufacturing Controller 5]

The manufacturing controller 5 controls the printing apparatus 100 so as to manufacture three-dimensional objects. The manufacturing controller 5 includes a discharge controller 5a, a curing controller 5b, and a scan controller 5c.

The manufacturing controller 5 receives information pertinent to the manufacturing of three-dimensional objects from the operation unit 4 and accordingly controls the printing apparatus 100 so as to form the body m, separation layer s', and support material s on the mounting unit 10.

The manufacturing controller 5 further controls timings of manufacturing three-dimensional objects A. The manufacturing controller 5 may control the printing apparatus 100 so as to start the manufacturing of a next three-dimensional object A during the time when a current three-dimensional object A manufactured is being separated from the mounting unit 10.

[Discharge Controller 5a]

The discharge controller 5a is in charge of discharge control of the inks from the heads Y, M, C, K, T, W, MO, and S. The discharge controller 5a controls, for example, amounts of the inks discharged from the heads, and timing of discharging the inks.

[Curing Controller 5b]

The curing controller 5b controls the UV-LED lamps 2a, 2b, and 2c. The curing controller 5b controls timings of radiating ultraviolet light from the UV-LED lamps and quantities of ultraviolet light.

[Scan Controller 5c]

The scan controller 5c moves the carriage 1 in the main and sub scanning directions for scans, and also moves the carriage 1 in the Z direction in keeping with the level of the uppermost surface of ink layers rising upward as the manufacturing of the three-dimensional object A advances. The scan controller 5c controls the directions, moving speeds, and timings of scans by the carriage, and the mounting unit. The scan controller 4c controls the rotation and pressure of the flattening roller 3 during the main scans.

[Movement Controller 6]

The movement controller 6 controls a separation roller 30. Specifically, the movement controller 6 controls the separation roller 30 so as to move the three-dimensional object A still attached to the mounting surface 10a of the mounting unit 10 from a manufacturing position R to a separating position r after the manufacturing of the three-dimensional object A is completed.

The movement controller 6 further controls the separation roller 30 so as to move the three-dimensional object A in the main scanning direction at the separating position r.

The movement controller 6 may prompt the separator 40, instead of the mounting unit 10, to move to the separating position r or may prompt both of the mounting unit 10 and the separator 40 to move to the separating position r.

[Separation Controller 7]

The separation controller 7 controls the separation roller (moving unit) 30 so as to move a cutting portion 40a of the separator 40 in the −Y direction at the separating position r. As a result of this movement, the cutting portion 40a of the separator 40 separates the three-dimensional object A from the mounting unit 10.

To cut the three-dimensional object, the separation controller 7 may fix the separator 40 at the separating position r and push the mounting unit 10 against the separator 40, may move the separator 40 toward the mounting unit 10 fixed at a position, or may move both of the mounting unit 10 and the separator 40 toward each other.

[Mounting Unit 10]

The mounting unit 10 is a member on which the three-dimensional object A is retained during and after the manufacturing until the separation of the three-dimensional object A is done. Until the three-dimensional object A is separated from the mounting unit 10 by the separator 40 after the manufacturing started, the three-dimensional object A stays on the mounting surface 10a of the mounting unit 10.

[Endless Belt 10']

The purposes of an endless belt 10' are to have the mounting unit 10 placed thereon and to transport the mounting unit 10.

By driving the separation roller 30 after the manufacturing of the three-dimensional object A is completed, the endless belt 10' is driven in the Y direction, thereby moving the mounting unit 10 on the endless belt 10' from the manufacturing position R to the separating position r.

[Separation Roller 30]

The separation roller 30 drives the endless belt 10'. After the manufacturing of the three-dimensional object A is completed, the separation roller 30 moves the three-dimensional object A still attached to the mounting surface 10a of the mounting unit 10 from the manufacturing position R to the separating position r.

Upon the arrival of the three-dimensional object A at the separating position r, the separation roller 30 further drives the endless belt 10'. Then, the three-dimensional object A is pushed against the separator 40 and thereby cut off Instead, the separator 40 may be moved to facilitate the cutoff of the three-dimensional object A.

The moving unit thus controlled in the three-dimensional object manufacturing apparatus is a non-limiting example of this disclosure, and may be selected from various devices that can move the mounting unit and the separator toward each other. The moving unit may be an internal component of the three-dimensional object manufacturing apparatus or may be an external device connected to the apparatus.

[Separator 40]

The separator 40 separates the three-dimensional object A from the mounting unit 10. The separator 40 described in this embodiment is a claw-like separator. The separator 40, however, may be selected from the various known devices that separate three-dimensional objects from a mounting table, examples of which may include saw blades and wires. The cutting portion 40a of the separator 40 cuts the boundary between the three-dimensional object A and the mounting unit 10 and thereby separates the three-dimensional object A from the mounting unit 10.

Materials of the cutting portion of the separator may include stainless steels, plastics, steels, and diamond.

In this embodiment, the three-dimensional object is cut in a manner that a cut surface obtained by the cutting portion 40a is substantially parallel to the mounting surface 10a of the mounting unit 10. By cutting the three-dimensional object in such a direction, the cutting portion 40a may be prevented from colliding against the mounting surface 10a or from thrusting into the three-dimensional object A. This may avoid possible damage to the mounting unit 10 and/or the three-dimensional object A. Cutting by the hand may involve the risk of damaging the three-dimensional object A because fine control of a cutting force is difficult. On the other hand, mechanical control of the cutting force using the apparatus may be easier, preventing the risk of damaging the three-dimensional object A.

[Collection Guiding Unit 50]

The collection guiding unit 50 is disposed at a position between the separating position r and the collecting unit 60.

By providing the collection guiding unit 50 thus located, the three-dimensional object A separated from the mounting unit 10 may be transported to the collecting unit 60 without causing damage to the three-dimensional object.

The collection guiding unit 50 is disposed so as to incline, from the separating position r toward the collecting unit 60, vertically downward (−Z direction) by degrees relative to the mounting surface 10a. Then, the collecting unit 60 may be located on the vertically lower side (in the −Z direction) than the separating position r relative to the mounting surface 10a.

[Collecting Unit 60]

The collecting unit 60 collects the three-dimensional object A separated from the mounting unit 10.

The collecting unit 60 is disposed at a position displaced in the −Z direction from the three-dimensional object A located at the separating position r. The collection guiding unit 50 and the collecting unit 60 may collect three-dimensional objects A successively one after another without damaging them.

[Three-Dimensional Object A]

The three-dimensional object A includes the body m, separation layer s' and support material s.

After the separation layer s' is formed, the body m and the support material s are formed on the separation layer s', and the three-dimensional object A is obtained.

[Body m]

The body m is constructed of layers formed in a stacked configuration using the inks discharged from the heads Y, M, C, K, T, W, and MO.

The ultraviolet curing-type inks are used to form the body m. Photo-curable inks, such as ultraviolet curing-type inks, may be quickly and readily curable. The layers, therefore, may be formed by discharging such inks at short time intervals. Then, the layers may be readily stacked on one another, and the body m may be formed in a shorter period of time.

[Separation Layer s']

The ink for support material discharged from the head s is used to form the separation layer s'. The separation layer s' may facilitate the separation of the body m from the mounting unit 10, and may prevent possible damage to the body m and/or the mounting unit 10. Providing the separation layer is a non-limiting example of this disclosure. A user may optionally decide whether the separation layer should be formed.

The separation layer s' may preferably have an adequate thickness that can prevent possible damage to the body m caused by the separator 40 inserted between the separation layer s' and the mounting unit 10. The thickness, depending on the size of the three-dimensional object A, may preferably be between 100 µm and 1 mm.

[Support Material s]

The ink for support material discharged from the head S is used to form the support material s. The support material s supports an overhang portion of the body m from its lower side. In the case the body m has an upper portion in the layer-stacking direction that has a greater width than a lower portion, the support material s is formed at the lower position to support the wider upper portion, i.e., overhang portion.

The support material s is formed by using the same ink for support material as the separation layer s'. These two layers are, therefore, substantially the same layers.

The ink for support material may preferably be soluble in a solvent because it allows for easy removal of the ink. Examples of the ink soluble in a solvent may include water-swelling gels, water-soluble materials, and ultraviolet-curable compounds soluble in solvents after curing. In the case the ink for support material contains an ultraviolet curing-type ink, the separation layer s' may be quickly and readily formed.

[Manufacturing Method for Three-Dimensional Object A]

A three-dimensional object manufacturing method is hereinafter described before the separation of the three-dimensional object A from the mounting unit 10 is described.

While the scan controller 5c is reciprocating the carriage 1 in the main scanning direction, the discharge controller 5a prompts the head S to discharge the support material ink S, and the curing controller 5b prompts the UV-LED lamps 2b and 2c to radiate ultraviolet light. As a result, the separation layer s' is formed. The respective controllers may receive information for the formation of the separation layer from the operation unit 4 and use the received information for their operation controls. Optionally, a user may input information pertinent to the body m alone to the operation unit 4. Then, the shape and the thickness required of the separation layer s' may be calculated by the controllers or a different controller.

The separation layer s' may consist of a plurality of stacked unit layers so as to have a desired thickness. In the case of stacking the plural unit layers to form the separation layer s', the carriage 1 is moved in the Z direction after each one of the unit layers is formed. The movement of the carriage 1 in the Z direction may be controlled by the scan controller 5c. This may leave a constant distance between the ink discharge surface of the carriage 1 and ink landing positions. The same applies to the body m and the support material s described later. Instead of or in combination with the movement of the carriage 1 in the Z direction, the mounting unit 10 may be moved in the −Z direction. The movement of the mounting unit 10 in the −Z direction may be controlled by the scan controller 5*c*.

After the separation layer s' is formed, the body m and the support material s are framed. While the scan controller 5*c* is moving the carriage 1 in the main and sub scanning directions and the Z direction, the discharge controller 5*a* prompts the heads Y, M, C, K, T, W, MO, and S to discharge the inks, and the curing controller 5*b* prompts the UV-LED lamps 2*a*, 2*b*, and 2*c* to radiate ultraviolet light. As a result, the body m and the support material s are formed.

The three-dimensional object A is finally obtained by thus forming the separation layer s', body m, and support material s.

[Method of Separating the Three-Dimensional Object A from the Mounting Unit 10]

A method of separating the three-dimensional object A from the mounting unit 10 is hereinafter described.

As illustrated in FIG. 1, the movement controller 6 transmits an instruction to the separation roller 30 so as to move the three-dimensional object A still attached to the mounting unit 10 from the manufacturing position R to the separating position r.

The movement controller 6 determines that the mounting unit 10 should start to move upon the receipt of information from the manufacturing controller 5 that notifies completion of the manufacturing of the three-dimensional object.

The manufacturing position R refers to a position at which the three-dimensional object is manufactured, while the separating position r refers to a position at which the three-dimensional object A is separated from the mounting unit 10 by the separator 40. As illustrated in FIG. 1, the manufacturing position R and the separating position r are different positions.

The movement controller 6 drives the separation roller 30 to move the three-dimensional object A until it arrives at the separating position r.

The separation controller 7 controls the separation roller 30 so as to move the three-dimensional object A in the Y direction at the separating position r. By pushing the cutting portion of the separator 40 in the −Y direction, the three-dimensional object A including the separation layer s' is separated from the mounting unit 10. The separation controller 7 receives information from the movement controller 6 that notifies arrival of the three-dimensional object A at the separating position r, and correspondingly starts the separation of the three-dimensional object by the separator 40.

By the time when the separation of the three-dimensional object A by the separator 40 is over after the manufacturing of the three-dimensional object A is completed, the manufacturing controller 5 sets a new mounting unit 10 in place to start the manufacturing of a next three-dimensional object A. Controlling the operation in this manner may allow three-dimensional objects to be manufactured more efficiently (improved manufacturing efficiency or turnover rate).

The three-dimensional object A separated from the mounting unit 10 is transported in the X direction by the collecting unit 60 by way of the collection guiding unit 50.

As a result, the three-dimensional object A may be manufactured and separated from the mounting unit 10 more efficiently.

Second Embodiment

Figure 2:
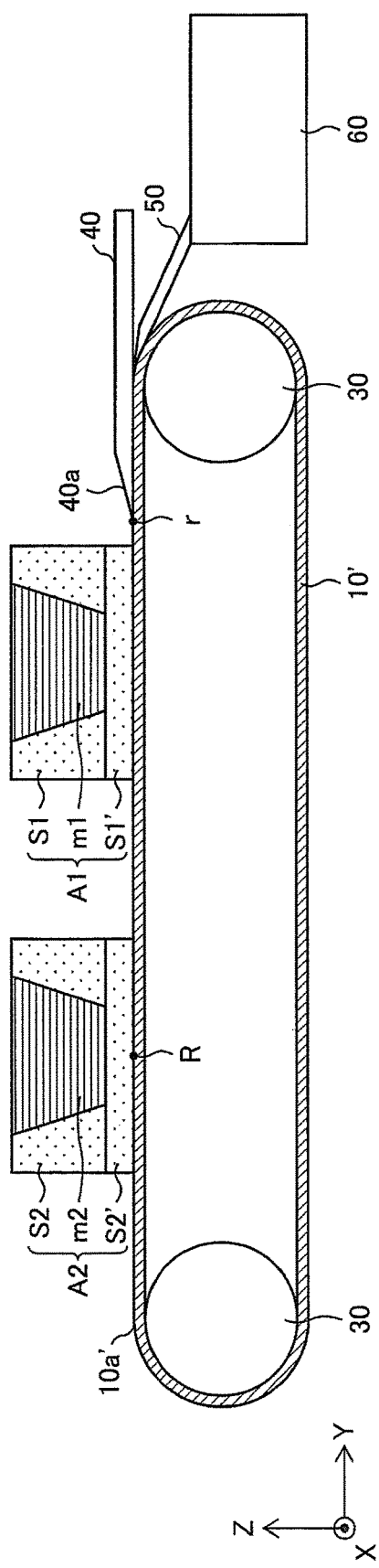
FIG. 2 is a schematic drawing of steps of manufacturing three-dimensional objects A1 and A2 and steps of separating the three-dimensional object A1 in an embodiment of the three-dimensional object manufacturing apparatus disclosed herein.

A second embodiment of the three-dimensional object manufacturing apparatus disclosed herein is hereinafter described referring to FIG. 2. FIG. 2 is a schematic drawing of steps of manufacturing three-dimensional objects A1 and A2 and steps of separating the three-dimensional object A1 in the second embodiment of the three-dimensional object manufacturing apparatus disclosed herein.

This embodiment is different to the first embodiment in that the endless belt 10' is used as a mounting unit instead of the mounting unit 10. Exemplified materials of the endless belt 10' may include tempered wire-containing resins, rubbers, and metallic plates, among which the metallic plates may preferably be used. Of the metallic plates, flexible stainless sheet metal may be particularly preferable in terms of durability and precision in movement. The three-dimensional objects A1 and A2, bodies m1 and m2, separation layers s1' and s2', and support materials s1 and s2 have the same functions as the three-dimensional object A, body m, separation layer s', and support layer s according to the first embodiment. Description of these objects and their structural elements is, therefore, omitted. A description is hereinafter given to differences to the first embodiment. The description of the first embodiment applies to any matters not described in this embodiment.

The body m1, separation layer s1', and support material s1 constituting the three-dimensional object A1 are directly formed on the endless belt 10'. In this embodiment, the endless belt 10' thus includes the functions of the mounting unit 10.

The movement controller 6 drives the separation roller 30 to move the three-dimensional object A1 still attached to the endless belt 10' from the manufacturing position R to the separating position r. The three-dimensional object A1 is accordingly moved from the manufacturing position R to the separating position r.

The three-dimensional object A1 located at the separating position r is separated from the endless belt 10' as described in the first embodiment.

The three-dimensional object A1 separated from the endless belt 10' is transported in the X direction by the collecting unit 60 by way of the collection guiding unit 50.

The manufacturing controller 5 controls the carriage 1 so as to start to manufacture the body m2, separation layer s2', and support material s2 constituting the three-dimensional object A2 by the time when the separation of the three-dimensional object A1 by the separator 40 is over after the manufacturing of the three-dimensional object A1 is completed.

After the manufacturing of the three-dimensional object A1 is completed, the three-dimensional object A2 may start to be manufactured by the time when the separation of the three-dimensional object A1 by the separator 40 is over. As a result, the three-dimensional object may be manufactured and collected from the apparatus more efficiently.

Modified Examples of Separator

Other examples of the separator 40 that may be used instead of the claw-like separator are hereinafter described. The like components are illustrated with like reference signs, description of which is omitted.

Modified Example 1 of Separator 40

Figure 3A:
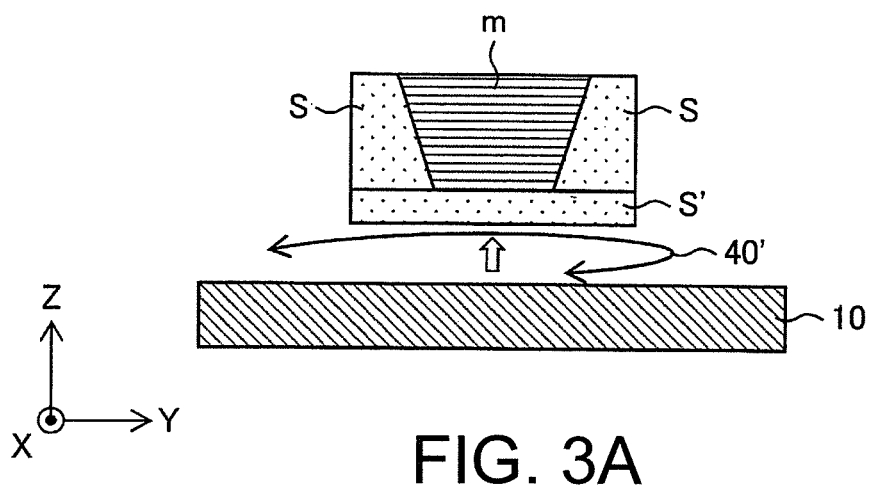
FIG. 3A and FIG. 3B are schematic drawings of modified examples of a separator 40 in an embodiment of the three-dimensional object manufacturing apparatus disclosed herein.

Using a diamond wire 40' as the separator 40 is hereinafter described referring to FIG. 3A. The diamond wire 40' is a wire coated with diamond abrasive grains for cutting purpose.

By driving the separation roller 30, the three-dimensional object A is cut by the diamond wire 40' pushed against the separation layer s' and thereby separated from the mounting unit 10. The separation controller 7 may move the diamond wire 40' instead of driving the separation roller 30.

The diamond wire 40', used as the separator 40, may cut off the three-dimensional object A from the mounting unit 10 without generating heat. In the case the separation layer s' is a very hard layer, the diamond wire 40' may be useful for cutting such a hard layer.

Modified Example 2 of Separator 40

Figure 3B:
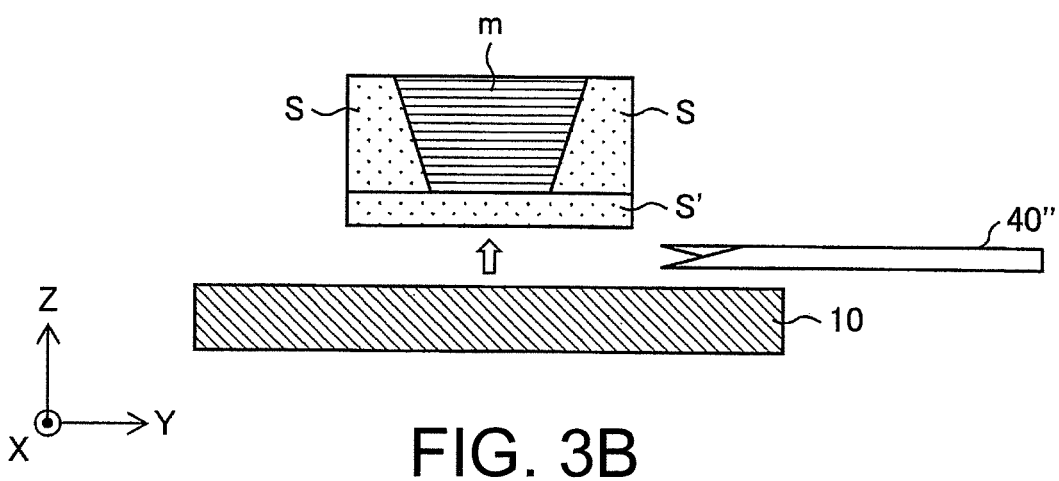

Using a saw blade 40" as the separator 40 is hereinafter described referring to FIG. 3B.

The three-dimensional object A is separated from the mounting unit 10 by reciprocating the saw blade 40" pushed against the separation layer s' in the X direction.

A cutting speed at the time may preferably be within a range of speeds that can prevent the separation layer s' from being dissolved or deformed by heat generated by the cutting work.

Further, the separation layer s' may preferably have a thickness greater than or equal to the thickness of the saw blade 40" to avoid possible damage to the body m at the time of separating the three-dimensional object using the saw blade.

Thus, the saw blade 40", when used as the separator, may successfully separate the three-dimensional object.

[Software-Implemented Example]

The manufacturing controller 5 including the discharge controller 5a, curing controller 5b, and scan controller 5c, the movement controller 6, and the separation controller 7 may be implemented by logic circuits (hardware) formed in an integrated circuit (IC chip) or may be software-implemented and executed by a central processing unit (CPU).

In the latter case, the manufacturing controller 5 including the discharge controller 5a, curing controller 5b, and scan controller 5c, the movement controller 6, and the separation controller 7 each include a CPU that executes software programs that effectuate their functions, a read-only memory (ROM) or a storage device in which the program and various pieces of data are recorded in a computer (or CPU)-readable manner (collectively called, "storage media"), and a random access memory (RAM) for deploying the program. The computer (or CPU) reads the program from such a recording medium and executes the read program to accomplish the technical aspects described in this disclosure. Examples of the recording media may include "non-transitory tangible media" such as tapes, disc, cards, semiconductor memories, and programmable logic circuits. The program may be downloaded into the computer through an optional transmission medium (communication network or broadcast waves) on which the program is transmittable. The technical aspects described in this disclosure may be accomplished in the form of data signals embedded in carrier waves through which the programs are electronically transmitted.

[Additional Remarks]

As described thus far, the printing apparatus 100 includes: a mounting unit 10 having a mounting surface 10a on which a three-dimensional object A being manufactured is mounted; and a movement controller 6 that controls a separation roller 30 configured to move the three-dimensional object A remaining on the mounting surface 10a and a separator 40 configured to separate the three-dimensional object A from the mounting unit 10 relative to each other after the manufacturing of the three-dimensional object A is completed. The three-dimensional object A on the mounting surface 10a and the separator 40 are moved to arrive at a separating position r at which the three-dimensional object A is separated by the separator 40.

The control method according to an embodiment of this disclosure controls the printing apparatus 100 including: a mounting unit 10 having a mounting surface 10a on which a three-dimensional object A being manufactured is mounted; a separator 40 configured to separate the three-dimensional object A from the mounting unit 10; and a separation roller 30 configured to move the three-dimensional object A on the mounting surface 10a and the separator 40 relative to each other. The separation roller 30 is controlled so as to move the three-dimensional object A remaining on the mounting unit 10 and the separator 40 to a separating position r at which the three-dimensional object A is separated by the separator 40 after the manufacturing of the three-dimensional object A is completed.

After the manufacturing of the three-dimensional object A is completed, the three-dimensional object A still attached to the mounting unit 10 may be automatically separated from the mounting unit 10 at the separating position r. Thus, the three-dimensional object A may be efficiently separated from the mounting unit 10.

The printing apparatus 100 according to an aspect of this disclosure may be further characterized in that the separator 40 has a cutting portion 40a that partly cuts the three-dimensional object A to separate the three-dimensional object A from the mounting surface 10a, the cutting portion 40a cuts the three-dimensional object A in a manner that a cut surface of the three-dimensional object A is substantially parallel to the mounting surface 10a, and the separation controller 7 controls the separation roller 30 so as to move the mounting surface 10a and the cutting portion 40a relative to each other and have the cutting portion 40a cut the three-dimensional object A.

Examples of the cutting portion 40a may include a claw-like separator, a wire and a blade. By having the cutting portion 40a cut the three-dimensional object A in a manner that its cut surface is substantially parallel to the mounting surface 10a, the cutting portion 40a may be prevented from colliding against the mounting surface 10a or from thrusting into the three-dimensional object A. This may avoid possible damage to the mounting unit 10 and/or the three-dimensional object A. Cutting by the hand may involve the risk of damaging the three-dimensional object A because fine control of a cutting force is difficult. On the other hand, mechanical control of the cutting force using the printing apparatus 100 may be easier, preventing the risk of damaging the three-dimensional object A.

The printing apparatus 100 according to another aspect of this disclosure may be further characterized in that materials of the cutting portion include at least one selected from a stainless steel, a plastic, a steel, and a diamond.

The cutting portion including one selected from such materials may adequately separate the three-dimensional object A from the mounting unit 10.

In the printing apparatus 100, the separating position r and the manufacturing position R at which the three-dimensional object A is manufactured are different positions. The separation controller 7 controls the separation roller 30 so as to move the three-dimensional object A from the manufacturing position R to the separating position r after the manufacturing of the three-dimensional object A is completed.

By thus moving the three-dimensional object A from the manufacturing position R to a different work area for object separation after the manufacturing of the three-dimensional object A is completed, a next three-dimensional object may start to be manufactured at the manufacturing position R. This may allow three-dimensional objects to be manufactured more efficiently (improved manufacturing efficiency or turnover rate).

The printing apparatus 100 has an endless belt 10' as the mounting unit 10.

The printing apparatus 100 thus having the endless belt 10' and the separation roller 30 integrally formed may facilitate the relative movements of the three-dimensional object A and the separator 40 toward the separating position r. As a result, the three-dimensional object A may be manufactured and separated from the endless belt 10' more efficiently.

The printing apparatus 100 further includes a collecting unit 60 that collects the three-dimensional object A separated from the mounting unit 10, and a collection guiding unit 50. The collection guiding unit 50 is disposed at a position between the separating position r and the collecting unit 60. The collecting unit 60 is disposed at a position displaced in the −Z direction from the separating position r.

By having the collection guiding unit 50 disposed between the collecting unit 60 and the separating position r and having the collecting unit 60 disposed in the −Z direction relative to the separating position r, the separated three-dimensional object A may be collected without being damaged.

The printing apparatus 100 according to yet another aspect of this disclosure may be further characterized in that the endless belt 10' is structured to have plural three-dimensional objects A1 and A2 mounted on the mounting surface, the manufacturing position R and the separating position r are different positions, and the separation controller 7 controls the separation roller 30 so as to locate the mounting surface 10a on which the three-dimensional object A2 is mounted at the manufacturing position R by the time when the separation of the three-dimensional object A1 is completed after arriving at the separating position r.

The printing apparatus 100 may start to manufacture the three-dimensional object A2 by the time when the separation of the three-dimensional object A1 by the separator 40 is done after arriving at the separating position r. This may conduce to an improved productivity.

In the printing apparatus 100, a part of the three-dimensional object A, A1, A2 cut by the cutting portion 40a is a separation layer s', s1', s2' between the body m, m1, m2 to be separated and the mounting surface 10a, 10a'.

The separation layer s1, s1', s2' interposed between the mounting unit 10 and the body m, m1, m2 of the three-dimensional object A, A1, A2 may facilitate the separation of the three-dimensional object A, A1, A2 from the mounting unit 10. Further favorably, possible damage to the body m, m1, m2 may be prevented at the time of separating the three-dimensional object A, A1, A2 from the mounting unit 10.

INDUSTRIAL APPLICABILITY

This disclosure is applicable to the manufacturing of three-dimensional objects.

What is claimed is:

1. A three-dimensional object manufacturing apparatus, comprising:
   a mounting unit having a mounting surface on which a three-dimensional object being manufactured is mounted;
   a separator configured to separate the three-dimensional object from the mounting unit;
   a plurality of ink jet heads configured to discharge ink droplets to form the three-dimensional object;
   a separation roller configured to move at least one of the three-dimensional object remaining on the mounting surface and the separator, so as to prompt the three-dimensional object remaining on the mounting surface and the separator are to be placed in a predetermined position after the manufacturing of the three-dimensional object is completed, wherein the three-dimensional object on the mounting surface and the separator are moved to arrive at a separating position at which the three-dimensional object is separated by the separator; and
   a controller that controls the separation roller,
   wherein the separator comprises a cutting portion that partly cuts the three-dimensional object to separate the three-dimensional object from the mounting surface,
   the plurality of ink jet heads discharges the ink droplets and forms the three-dimensional object that is integrally formed of a body, a separation layer and a support material, wherein the separation layer is interposed between the mounting surface and the body, and the support material supports the body during the manufacturing of the three-dimensional object and is removed after the manufacturing of the three-dimensional object, and
   the plurality of ink jet heads discharge a same ink for forming the separation layer and the support material so that a material of the separation layer and a material of the support material are the same.

2. The three-dimensional object manufacturing apparatus according to claim 1, wherein
   the cutting portion cuts the three-dimensional object in a manner that a cut surface of the three-dimensional object is substantially parallel to the mounting surface, and
   the controller controls the separation roller so as to move the three-dimensional object and the cutting portion relative to each other and have the cutting portion cut the three-dimensional object.

3. The three-dimensional object manufacturing apparatus according to claim 2, wherein materials of the cutting portion include at least one selected from a stainless steel, a plastic, a steel, and a diamond.

4. The three-dimensional object manufacturing apparatus according to claim 1, wherein a manufacturing position at which the three-dimensional object is manufactured and the separating position are different positions, and
   the controller controls the separation roller so as to move the three-dimensional object from the manufacturing position to the separating position after the manufacturing of the three-dimensional object is completed.

5. The three-dimensional object manufacturing apparatus according to claim 2, wherein a manufacturing position at which the three-dimensional object is manufactured and the separating position are different positions, and
   the controller controls the separation roller so as to move the three-dimensional object from the manufacturing position to the separating position after the manufacturing of the three-dimensional object is completed.

6. The three-dimensional object manufacturing apparatus according to claim 1, wherein the mounting unit is an endless belt.

7. The three-dimensional object manufacturing apparatus according to claim 2, wherein the mounting unit is an endless belt.

8. The three-dimensional object manufacturing apparatus according to claim 1, further comprising:
   a collecting unit that collects the three-dimensional object separated from the mounting unit; and
   a collection guiding unit, wherein
   the collection guiding unit is disposed at a position between the separating position and the collecting unit, and
   the collecting unit is disposed at a position on a vertically lower side than the separating position relative to the mounting surface.

9. The three-dimensional object manufacturing apparatus according to claim 2, further comprising:
   a collecting unit that collects the three-dimensional object separated from the mounting unit; and
   a collection guiding unit, wherein
   the collection guiding unit is disposed at a position between the separating position and the collecting unit, and
   the collecting unit is disposed at a position on a vertically lower side than the separating position relative to the mounting surface.

10. The three-dimensional object manufacturing apparatus according to claim 6, wherein
    the mounting unit is structured to have a plurality of the three-dimensional objects mounted on the mounting surface,
    the manufacturing position and the separating position are different positions, and
       the controller controls the separation roller so as to locate the mounting surface on which one of the three-dimensional objects is mounted at the manufacturing position by the time when the separation of another one of the three-dimensional objects is completed after arriving at the separating position.

11. The three-dimensional object manufacturing apparatus according to claim 7, wherein
    the mounting unit is structured to have a plurality of the three-dimensional objects mounted on the mounting surface,
    the manufacturing position and the separating position are different positions, and
       the controller controls the separation roller so as to locate the mounting surface on which one of the three-dimensional objects is mounted at the manufacturing position by the time when the separation of another one of the three-dimensional objects is completed after arriving at the separating position.

12. The three-dimensional object manufacturing apparatus according to claim 2, wherein a part of the three-dimensional object cut by the cutting portion is a separation layer interposed between a body of the three-dimensional object to be separated and the mounting surface.

13. A control method, for a three-dimensional object manufacturing apparatus that includes:
    a mounting unit having a mounting surface on which a three-dimensional object being manufactured is mounted;
    a separator configured to separate the three-dimensional object from the mounting unit;
    a plurality of ink jet heads configured to discharge ink droplets to form the three-dimensional object; and
    a separation roller configured to move at least one of the three-dimensional object on the mounting surface and the separator, so as to prompt the three-dimensional object remaining on the mounting surface and the separator are to be placed in a predetermined position,
    the control method comprising:
    controlling the separation roller so as to move the three-dimensional object remaining on the mounting surface and the separator to a separating position at which the three-dimensional object is separated by the separator after the manufacturing of the three-dimensional object is completed,
    wherein the separator comprises a cutting portion that partly cuts the three-dimensional object to separate the three-dimensional object from the mounting surface,
    controlling the plurality of ink jet heads to discharge the ink droplets to form the three-dimensional object that is integrally formed of a body, a separation layer and a support material, wherein the separation layer is interposed between the mounting surface and the body, and the support material supports the body during the manufacturing of the three-dimensional object and is removed after the manufacturing of the three-dimensional object, and
    controlling the plurality of ink jet heads to discharge a same ink for forming the separation layer and the support material so that a material of the separation layer and a material of the support material are the same.

* * * * *